United States Patent [19]

Anderson et al.

[11] Patent Number: 4,616,965
[45] Date of Patent: Oct. 14, 1986

[54] INDEXABLE SHELL CUTTER

[75] Inventors: Russell W. Anderson, Milwaukie; Michael J. Held, Portland, both of Oreg.

[73] Assignee: Manufacturers Tool Service, Inc., Portland, Oreg.

[21] Appl. No.: 583,712

[22] Filed: Feb. 27, 1984

[51] Int. Cl.⁴ .......................................... B23B 27/10
[52] U.S. Cl. .................................. 408/204; 407/101; 408/703; 408/713
[58] Field of Search ............... 408/204, 206, 703, 713, 408/187, 188, 203.5; 407/101

[56] References Cited

U.S. PATENT DOCUMENTS

| | | | |
|---|---|---|---|
| 3,564,946 | 2/1971 | Kaser | 408/204 |
| 4,230,429 | 10/1980 | Eckle | 408/713 X |
| 4,422,812 | 12/1983 | Linville | 408/204 |
| 4,500,234 | 2/1985 | Orth et al. | 408/206 |

*Primary Examiner*—Z. R. Bilinsky
*Attorney, Agent, or Firm*—Robert E. Howard

[57] ABSTRACT

An indexable shell cutter having an improved cartridge for mounting a cutter insert on the cutting face of the shell cutter body. The cutter body has a plurality of recesses extending rearwardly from the cutting face, each of said recesses being formed by a first surface, a second surface spaced from the first surface, and a base surface extending between the first and second surfaces. The second surface is essentially perpendicular to the plane of the cutting face of the cutter head and is V-shaped in cross-section. A cartridge is removably secured in each of the recesses with the base of the cartridge being in mating engagement with the second surface of the recess. A replaceable and indexable cutter insert having a plurality of cutting edges is releasably secured in a recessed seat located in the outer end of each cartridge with the plane of its face being perpendicular to the plane of the cutting face of the cutter head and one of its cutting edges extending beyond the periphery of a cutting head a distance sufficient to cuttingly engage a workpiece. The other cutting edges of the cutter insert are matingly engaged with the walls of a recessed seat formed in the outer face of the cartridge.

4 Claims, 10 Drawing Figures

INDEXABLE SHELL CUTTER

BACKGROUND OF THE INVENTION

The invention relates to an indexable shell cutter having an improved cartridge for mounting a cutter insert on the cutting face of a shell cutter.

Shell cutters are used to make taps of approximately three inches to twelve inches in diameter into pipe of various sizes and compositions. Such pipes are typically made of cast iron, reinforced concrete, or steel. Shell cutters conventionally are fitted with replaceable cutting teeth of high speed steel or tungsten carbide. One such cutting teeth become worn due to use, either a backup shell cutter must be used or the teeth replaced on the job which results in downtime and increased labor costs.

It is also known to provide tapping machines with cutter teeth that are indexable, i.e., teeth which have more than one cutting edge which can be adjusted to provide a fresh cutting edge when the cutting edge becomes worn. Typical of such devices are those described in U.S. Pat. Nos. 3,643,310; 3,839,772; and 3,405,433. However, the very nature of making a cutting tooth indexable presents problems of accurate alignment of the cutting edge into cutting position and mounting the cutting tooth in a manner satisfactory to absorb the forces imposed perpendicularly on the tooth during the cutting operation.

SUMMARY OF THE INVENTION

It is an object of the present invention to provide a shell cutter having indexable cutting inserts which are held in cuttting position in a secure manner designed to more efficiently balance and direct cutting forces imposed thereon.

Further objects of this invention are to provide a shell cutter which will cut a wide variety of materials, which has cutter inserts that are easily indexable and replaceable on the job, which will fit a wide variety of tapping machines, which provides uniform chips for flushing, which provides a core or coupon which can be used in material examination, which eliminates regrinding and retipping, and which provides faster penetration rates.

These and other objects are achieved by employing an improved cartridge for mounting an indexable cutter insert on the cutting face of a shell cutter body. The cutter body has a plurality of axial recesses extending rearwardly from the cutting face, each such recess being formed by a first surface, a second surface spaced from the first surface opposite to the direction of rotation of the shell cutter, and a base surface extending between the first and second surfaces. The second surface of the recess is essentially perpendicular to the plane passing through the cutting face of the shell cutter head and is V-shaped in cross-section. The cartridges of the invention are removably mounted in each of the recesses with the base of the cartridge being in mating engagement with the second surface of the recess. A replaceable and indexable cutter insert having a plurality of cutting edges is releasably secured in a recessed seat located in the upper face of each such cartridge at the outer end thereof with the plane of its face being substantially perpendicular to the plane passing through the cutting face of the cutter head, and one of its cutting edges extending somewhat beyond the periphery of the cartridge and cutter head. The other cutting edges of the cutter insert are matingly engaged with the walls of the recessed seat located in the cartridge.

DESCRIPTION OF THE PREFERRED EMBODIMENTS

Figure 1:
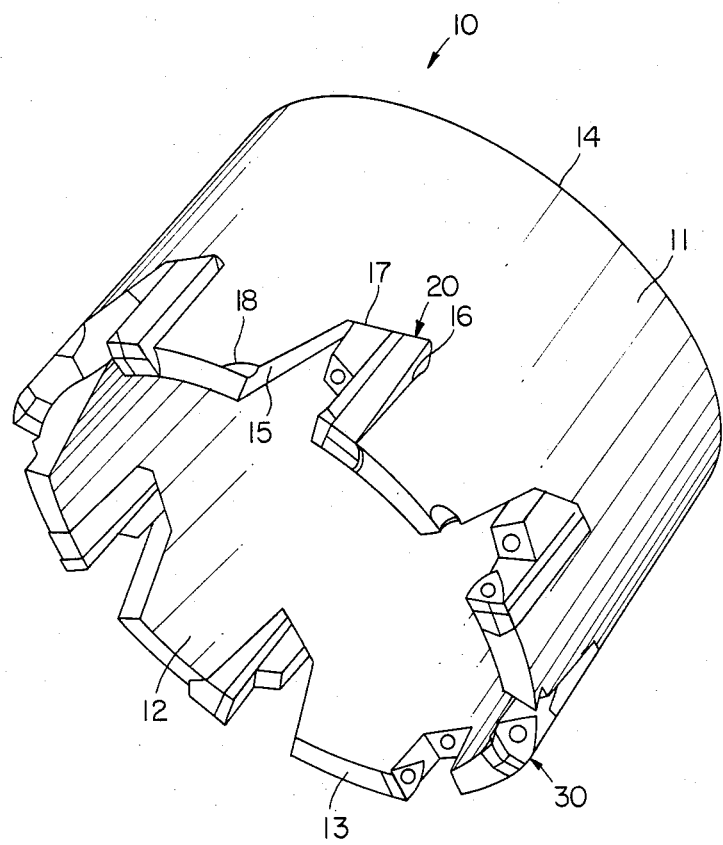
FIG. 1 is a perspective view of the cutter head of the invention.
Figure 2:
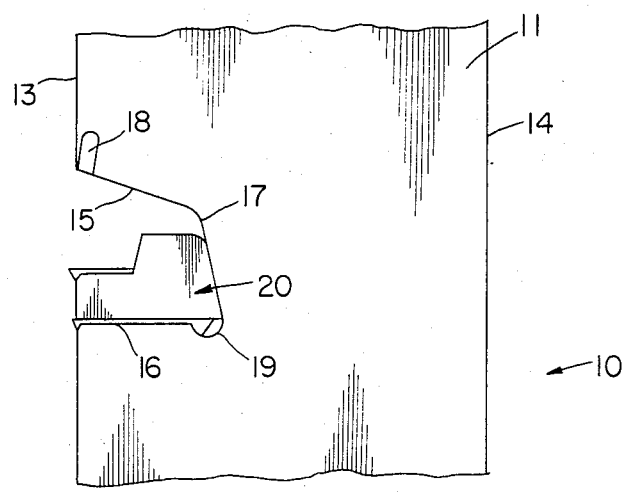
FIG. 2 is a partial side-view of the cutter head.
Figure 3:
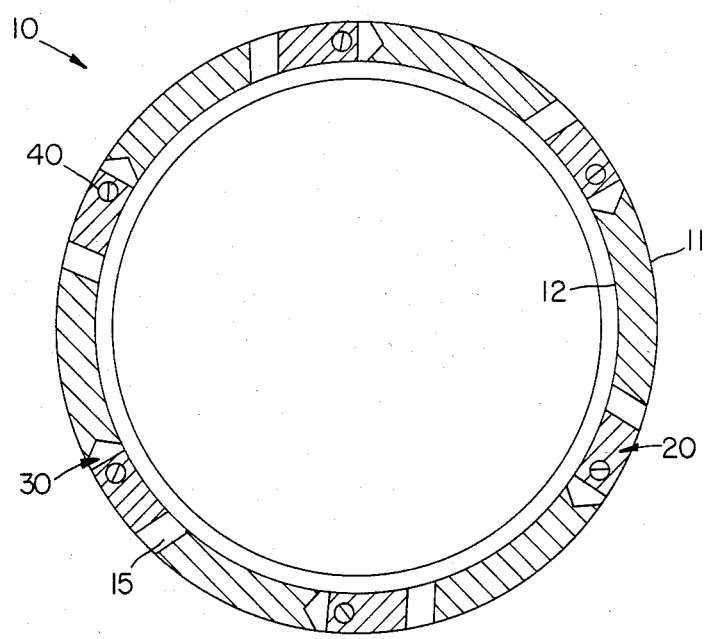
FIG. 3 is an axial view of the cutting face of the cutter head.

FIGS. 1–3 illustrate a shell cutter tool body 10 having cartridges 20 mounted on the cutting face thereof. Each cartridge 20 carries an indexable cutter insert 30, as illustrated.

Shell cutter tool body 10 is generally cylindrical in shape and has an outer surface 11, an inner surface 12, a cutting face 13 located on the outer end thereof, and a rearwardly facing end 14. The rearwardly facing end is adopted to be attachable to the shaft of a suitable power source, not shown, in a manner well known in the art.

A plurality of axial recesses are formed in cutting face 13, each of which recesses is comprised of a first, angled surface 15, a second surface 16 spaced from said first surface, and a base surface 17 extending between said first and second surfaces.

The first surface 15 is spaced from the second surface 16 in the direction of rotation of the cutter head 10, and is at an angle to the axial plane of the cutter head which, in the preferred embodiment, is approximately 20°.

The second surface 16 of the recess lies substantially within an axial plane and is essentially perpendicular to the plane passing through the cutting face 13. The cross-section of surface 16 is V-shaped. A bevel 18 is machined at the juncture of the first, angled surface 15 and cutting face 13. A groove 19 is milled at the inner end of second surface 16 at its juncture with base 17.

The base surface 17 is at an acute angle to second surface 16 and at an obtuse angle to first surface 15, as best seen in FIG. 2, to provide enhanced seating of cartridge 20. The acute angle in the preferred embodiment is approximately 75°.

The cartridge 20 of the present invention is best understood by reference in FIGS. 4–7 and 9 and 10. Cartridge 20 has a V-shaped base 21 extending downwardly from a main body portion 22. Shoulder 23 extends upwardly from main body portion 22 for approximately the innner half of the length of cartridge 20. An opening comprised of an enlarged head portion 24 and bore 25 extend at an angle through shoulder 23 and main body portion 22 for the purpose of receiving a fastening member, not shown.

A tapped bore 27 is machined into the outer end of the main body portion 22 of cartridge 20 for threadably receiving a fastening member, not shown, to secure cutter insert 30 thereto. A recessed seat 28 is machined into the upper surface of main body portion 22. The shape of the walls of recessed seat 28 are the same as approximately one-half the perimeter of cutter insert 30 so as to be able to matingly engage said insert when it is mounted on cartridge 20.

The outer end 29 of cartridge 20 is V-shaped and substantially the same shape as the cutting edges of cutter insert 30 to provide additional support for insert 30 during the cutting operation. The inner end of cartridge 20 is at an angle adopted to permit mating engagement with the base surface 17 of the recess in the cutter tool body 10.

Cutter insert 30 is generally triangular in shape and has an opening 31 therein for receiving a fastening member. The sides of cutter insert 30 extending between corners 32 and 34, 32 and 36, and 34 and 36 form the cutting edges of cutter insert 30 and have an elongated V-shape with apexes located at 33, 35, and 37, respectively. Cutter insert 30 has parallel faces 38 and 39 with face 38 being the outer face and face 39 being the inner face, as best seen by reference to FIG. 5.

Cutter insert 30 may be formed of any suitable hard, cutting material. It is preferred, however, to form cutter insert 30 of tungsten carbide.

Figure 4:
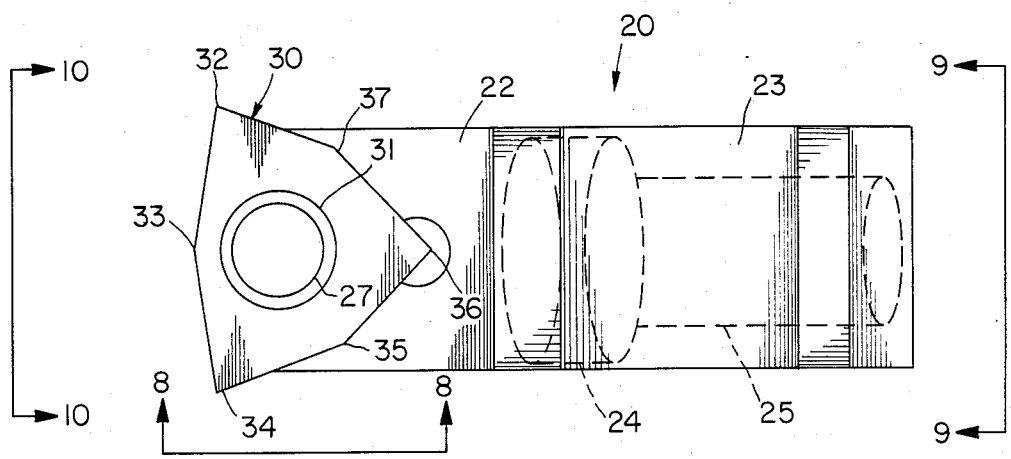
FIG. 4 is a top sectional view of the cartridge and cutter insert of the invention.
Figure 5:
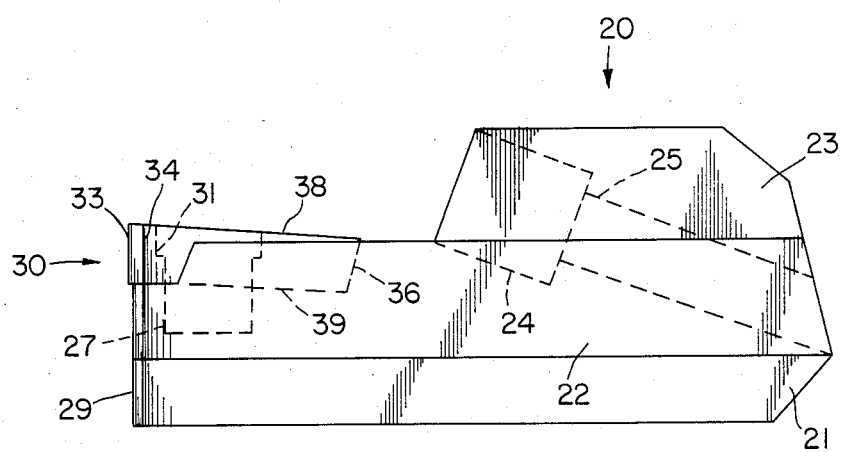
FIG. 5 is a side-sectional view of the cartridge and cutter insert.
Figure 6:
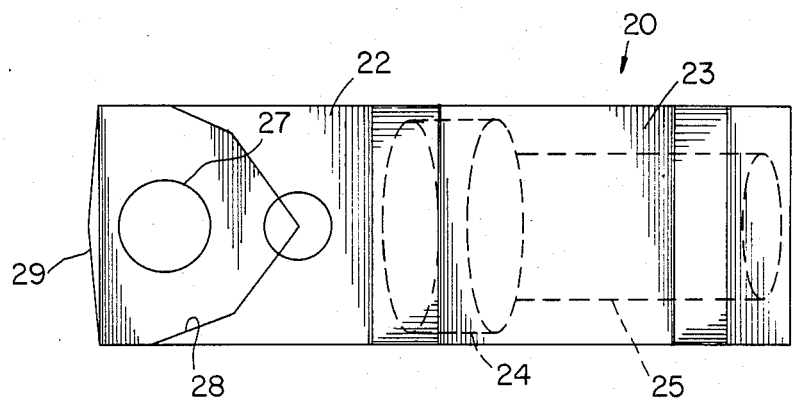
FIG. 6 is a partial sectional top-view of the cartridge of the invention.
Figure 7:
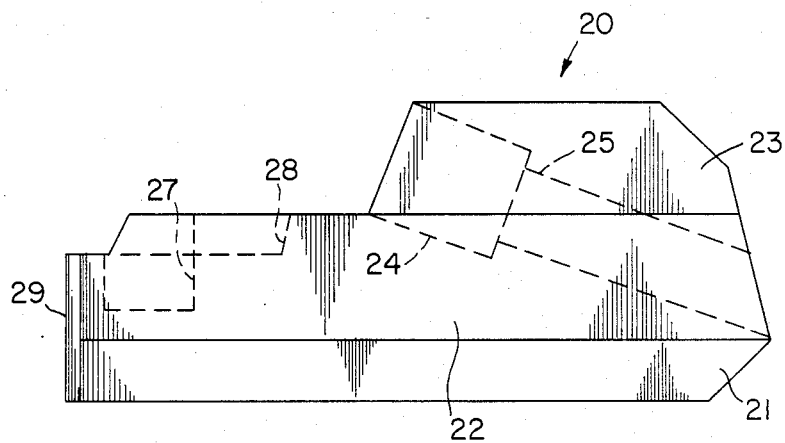
FIG. 7 is a sectional side-view of the cartridge.
Figure 8:
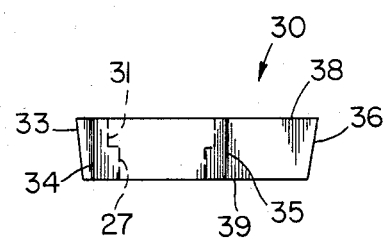
FIG. 8 is a partial sectional side-view of the cutter insert taken along line 8—8 of FIG. 4.
Figure 9:
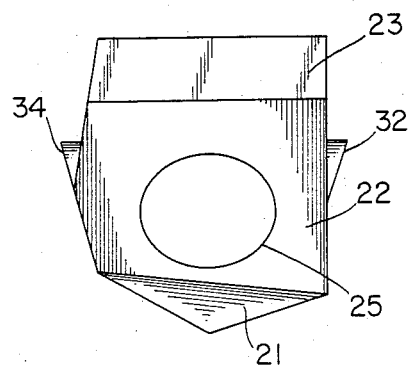
FIG. 9 is an end view of the inner end of the cartridge and insert taken along line 9—9 of FIG. 4.
Figure 10:
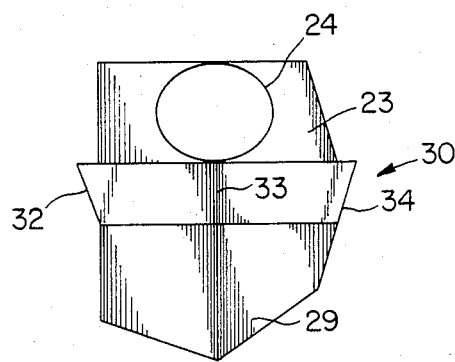
FIG. 10 is an end view of the outer end of the cartridge and insert taken along line 10—10 of FIG. 4.

Cutter insert 30 is mounted in recessed seat 28 of cartridge 20, as best seen by reference to FIGS. 4 and 5, by use of a suitable threaded fastening member, not shown. As best seen by reference to FIG. 5, the outer cutting edge of insert 30 extends slightly beyond the outer end 29 of cartridge 20 in order that the cutting edge may engage the pipe or other workpiece to be tapped. The plane of the outer face 38 of cutter insert 30 is at a slight angle to the plane of the outer upper surface of main body portion 22 of cartridge 20 to form a positive cutting rake. In the preferred embodiment, the angle between these two planes, i.e., the positive rake angle, is approximately 3°.

The cartridges 20 carrying cutters 30 are mounted in the recesses located in shell cutter tool body 10 as generally shown in FIGS. 1-3. The cartridges are located approximately sixty degrees apart although other equidistant spacing could be employed. The V-shaped base 21 of each cartridge 20 matingly engages the V-shaped second surface 16 of each recess in the shell cutter tool body 10. This mating configuration has been found to provide an enhanced ability to the cutter insert 30 to absorb forces imposed perpendicular to the face thereof during the cutting operation.

Each cartridge 20 is mounted in its recess by passing a threaded fastening member through bore 25 and into a tapped hole in alignment therewith located appropriately in shell cutter tool body 10, not shown. As mounted, the upper face of main body portion 22 lies in an axial plane of shell cutter tool body 10 facing toward the direction of rotation.

In operation, the shell cutter tool body 10 is mounted upon a suitable power source in a manner well known in the art. The cutter tool body 10 rotates counter-clockwise when viewed as illustrated in FIG. 1. Whenever the cutting edge of the cutter insert 30, which cutting edge extends between corners 32 and 34 as viewed in FIG. 4, becomes dull through use, the operator merely has to remove or loosen the threaded fastening member passing through opening 31, rotate the cutter insert so that a fresh cutting edge is in alignment with the outer end of cartridge 20, and resecure the cutter insert 30 on cartridge 20 by means of the threaded fastening member.

Similarly, the entire cutter insert 30 can be removed and replaced with a fresh cutter insert whenever all three of the cutting edges have become non-functional.

It is also possible to easily replace the entire cartridge 20 by merely removing the fastening member passing through bore 25.

What is claimed is:
1. A rotary cutting tool comprising:
   (a) a cylindrical cutting head having a circular cutting face;
   (b) a plurality of axial recesses formed in the outer periphery of said cutting head and extending rearwardly from said cutting face, said recesses being equidistantly spaced around the periphery of said cutting face, each of said recesses being formed by a first surface, a second surface spaced from said first surface a predetermined distance, and a base surface extending between said first and second surfaces at an acute angle to said second surface, said second surface being substantially perpendicular to the plane of the cutting face and V-shaped in cross-section;
   (c) a cartridge releasably secured in each of said recesses, each said cartridge having a V-shaped base in mating relationship with the second surface of each of said recesses, an upper face opposite said base, an inner end matingly engaging the base surface of said recess, and an outer end opposite to said inner end; and
   (d) a replaceable cutter insert having three cutting edges, each in the shape of an elongated V, indexably secured to the outer end of each of said cartridges with the outer face of said insert being substantially perpendicular to the plane passing through the cutting face of said cutting head, a first of said cutting edges extending beyond the outer end of said cartridge a distance sufficient to engage a workpiece, the outer end of said cartridge being similar in shape to said cutting edges.

2. The rotary cutting tool of claim 1 wherein said cutter insert is removably secured in a recessed seat located in the upper face of said cartridge at the outer end thereof.

3. The rotary cutting tool of claim 2 wherein the other of said cutting edges of the cutter insert matingly engage the walls of said recessed seat.

4. The rotary cutting tool of claim 3 wherein the plane of the outer face of such cutter insert is at an angle to the plane of the outer face of said cartridge such that a positive rake angle is formed.

* * * * *